(12) United States Patent
Rudolph

(10) Patent No.: US 7,224,748 B2
(45) Date of Patent: May 29, 2007

(54) METHOD FOR REDUCING OUT-OF-BAND AND SPURIOUS EMISSIONS OF AM TRANSMITTERS IN DIGITAL OPERATION

(75) Inventor: Dietmar Rudolph, Berlin (DE)

(73) Assignee: Deutsche Telekom AG, Bonn (DE)

( * ) Notice: Subject to any disclaimer, the term of this patent is extended or adjusted under 35 U.S.C. 154(b) by 636 days.

(21) Appl. No.: 10/433,527

(22) PCT Filed: Sep. 7, 2002

(86) PCT No.: PCT/DE02/03322

§ 371 (c)(1),
(2), (4) Date: Oct. 10, 2003

(87) PCT Pub. No.: WO03/032597

PCT Pub. Date: Apr. 17, 2003

(65) Prior Publication Data

US 2004/0076241 A1   Apr. 22, 2004

(30) Foreign Application Priority Data

Oct. 4, 2001   (DE) ............................... 101 50 937

(51) Int. Cl.
*H03C 1/52* (2006.01)
*H04L 27/04* (2006.01)
(52) U.S. Cl. .................................................. 375/300
(58) Field of Classification Search ................. 375/300
See application file for complete search history.

(56) References Cited

U.S. PATENT DOCUMENTS 5,251,330 A   10/1993   Chiba et al. ................... 455/91
6,005,894 A *  12/1999   Kumar ......................... 375/270
6,314,142 B1  11/2001   Perthold et al. ............. 375/296
2003/0108112 A1   6/2003   Rudolph et al. ............. 375/261
2004/0076241 A1 *  4/2004   Rudolph ....................... 375/300

FOREIGN PATENT DOCUMENTS

| DE | 4429535 | 2/1996 |
|---|---|---|
| DE | 4429535 | 12/1997 |
| DE | 19631388 | 1/1998 |
| DE | 10112025 | 9/2002 |
| EP | 0708545 | 4/1996 |
| EP | 0942563 | 9/1999 |

* cited by examiner

*Primary Examiner*—Jean B. Corrielus
*Assistant Examiner*—Nader Bolourchi
(74) *Attorney, Agent, or Firm*—Darby & Darby

(57) ABSTRACT

A method for reducing out-of-band and spurious emissions of AM transmitters in digital operation includes providing an amplitude signal and an RF-P signal from a digital modulation signal. The RF-P signal is tapped in the RF branch and the tapped signal is passed through a Gaussian filter in a separate branch, the Gaussian filter having a linear phase. The filtered RF-P signal is fed to an envelope detector to detect amplitude variations. The detected amplitude variations are combined as a correction signal with the amplitude signal in a multiplier in the A branch to produce a corrected amplitude signal. The corrected amplitude signal is fed to the linear input of the transmitter output stage and multiplied by the RF-P signal.

2 Claims, 1 Drawing Sheet $I(t) = M(t)*\cos[\phi(t)]$
$Q(t) = M(t)*\sin[\phi(t)]$

METHOD FOR REDUCING OUT-OF-BAND AND SPURIOUS EMISSIONS OF AM TRANSMITTERS IN DIGITAL OPERATION

CROSS-REFERENCE TO RELATED APPLICATIONS

This application is a U.S. National Stage Application under 35 U.S.C. §371 of PCT International Application No. PCT/DE02/03322, filed Sep. 7, 2002, which claims priority to German Patent Application No. 101 50 937.5, filed Oct. 4, 2001. Each of these applications is hereby incorporated by reference as if set forth in its entirety.

The present invention relates to the field of amplitude modulation (AM) broadcast transmitters used for digital broadcasting.

BACKGROUND

The usual transmitter types are non-linear AM transmitters featuring a radio frequency (RF) branch and an amplitude (A) branch. For reasons of higher efficiency, the RF branch and the amplitude branch operate in switched mode. In the output stage of the transmitter, the RF signal and the amplitude signal are multiplied by each other, which is also carried out in switched mode for reasons of efficiency. The switched mode is controlled by the RF signal. In contrast, for the amplitude signal, the input of the multiplier is linear.

FIG. 2 illustrates a modulated digital signal generated by two partial signals (the in phase (I) signal and the quadrature (Q) signal, which are orthogonal to each other. The I signal is modulated onto a cosine oscillation having the frequency Ft (carrier frequency). The Q signal is modulated onto a sine oscillation having the same frequency Ft. The sum of both modulated oscillations produces the complex modulated data signal (cosine 0–180degrees, sine −90–+90degrees). The modulated I/Q signal is shaped by filters in such a manner that it has exactly the prescribed curve shape with the desired bandwidth.

For digital broadcasting, the modulated I/Q signal is converted in such a manner that the two signals, amplitude (A) signal and phase-modulated carrier signal (RF-P signal), result therefrom which are suitable for proper control of the AM transmitter. Then, at the output of the AM transmitter, the modulated I/Q signal is generated again with higher power.

To minimize out-of-band and spurious emissions, it is required for the A signal and the signal to be present in the transmitter output stage at the same time. As a result of this, the delay between the two signals has to be compensated for and the remaining difference must not be greater than 0.3 microseconds, given a channel bandwidth of 9–10 KHz, since the permissible delay difference is reciprocally proportional to the channel bandwidth.

Since both the A-signal and the RF-P signal have a considerably larger bandwidth than the I/Q signal, the increased bandwidth should be available within the transmitter, which, however, cannot be achieved to a sufficient degree due to technical and economic reasons. The insufficient bandwidths result in unwanted out-of-band and spurious emissions which have to be minimized.

From German patent document DE 10112025.7, it is known that the bandwidth of the A-signal and RF-P signal can be reduced if the vector diagram of the I/Q signal is provided with a hole around the 0/0 point. The larger the hole in the vector diagram of the I/Q signal, the lower are the gradients of the out-of-band and spurious emissions in the spectrum. This connection is given by the fact that, spectrally, the gradients of the out-of-band and spurious emissions due to the delay differences correspond to the gradient of the RF-P signal, and are able to be partially corrected by the hole in the vector diagram. The hole in the vector diagram cannot be made as large as desired, because otherwise the modification of the signal appears as a disturbance.

It is also known that the shoulder distance of the out-of-band and spurious emissions depends both on the magnitude of the delay difference and on the available bandwidth in the amplitude branch and also in the RF branch of the transmitter. It follows therefrom that the delay difference should go toward zero, and that the bandwidth in the branches should be as large as possible.

Therefore, it is desirable to implement as large a bandwidth as possible for both branches in order to further reduce the out-of-band and spurious emissions of the AM transmitter. For the amplitude branch, it is possible to achieve a linear phase response and, thus, a constant delay up to the frequency limit by equalization in terms of delay.

The phase-modulated RF-P signal, just as a frequency-modulated signal, has an infinite number of lateral spectral lines so that the bandwidth required for transmission would theoretically have to be infinitely large as well. Since the weighting of the spectral lines decreases rapidly, it can be achieved by using a suitable filter that only a minimum of distortions occurs because of the limited bandwidth. It is known that this condition is satisfied by a filter having a Gaussian transfer function.

SUMMARY OF THE INVENTION

It is an object of the present invention to provide a method by which the influence on the frequency response that is attainable by using a Gaussian filter is used for the RF-P signal to minimize distortions due to the bandwith limitation and, thus, to reduce the out-of-band and spurious emissions during the broadcasting of digital signals using AM transmitters.

The present invention provides a method for reducing out-of-band and spurious emissions of AM transmitters in digital operation. The method includes:
  providing from a digital modulation signal, an amplitude signal in an A branch;
  providing from a digital modulation signal, a phase-modulated RF-P signal in an RF branch;
  tapping the RF-P signal in the RF-P branch so as to provided a tapped RF-P signal;
  passing the tapped RF-P signal through a Gaussian filter in a separate branch so as to provide a filtered RF-P signal, the Gaussian filter having a linear phase;
  feeding the filtered RF-P signal to an envelope detector so as to detect amplitude variations;
  combining the detected amplitude variations as a correction signal with the amplitude signal in a multiplier in the A branch so as to provide a corrected amplitude signal;
  feeding the corrected amplitude signal to the linear input of an output stage of the transmitter; and
  multiplying the corrected amplitude signal by the RF-P signal in the output stage.

The present invention also provides an AM transmitter for digital operation. The AM transmitter includes:
  an A branch configured to carry an amplitude signal provided from a digital modulation signal;
  an RF branch configured to carry a phase-modulated RF-P signal provided from the digital modulation signal;

a tapping branch configured to tap the RF-P signal so as to provided a tapped RF-P signal;

a Gaussian filter connected in a separate branch, the Gaussian filter having a linear phase and being configured to filter the tapped RF-P signal so as to provided a filtered RF-P signal;

an envelope detector configured to receive the filtered RF-P signal so as to detect amplitude variations;

a first multiplier connected in the A branch and configured to combine the detected amplitude variations as a correction signal with the amplitude signal so as to provide a corrected amplitude signal;

an output stage having a linear input configured to receive the corrected amplitude signal; and a second multiplier connected in the output stage and configured to multiply the corrected amplitude signal by the RF-P signal.

The method starts from the assumption that a filter having a Gaussian-shaped amplitude response and linear phase is used for the RF-P signal. Due to this, the RF-P signal at the output of the filter obtains an amplitude response corresponding to a Gaussian transfer function. If the RF-P signal could be multiplied in this form by the A signal, there would be a reduction in the out-of-band and spurious emissions and the desired result could be accomplished quite easily. However, since the transmitter output stage operates in switched mode for reasons of efficiency, the amplitude response of the RF-P signal achieved by the Gaussian filter would be cut off again.

BRIEF DESCRIPTION OF THE DRAWING

The present invention is elaborated upon below based on an exemplary embodiment with reference to the drawing, in which.

DETAILED DESCRIPTION

Figure 1:
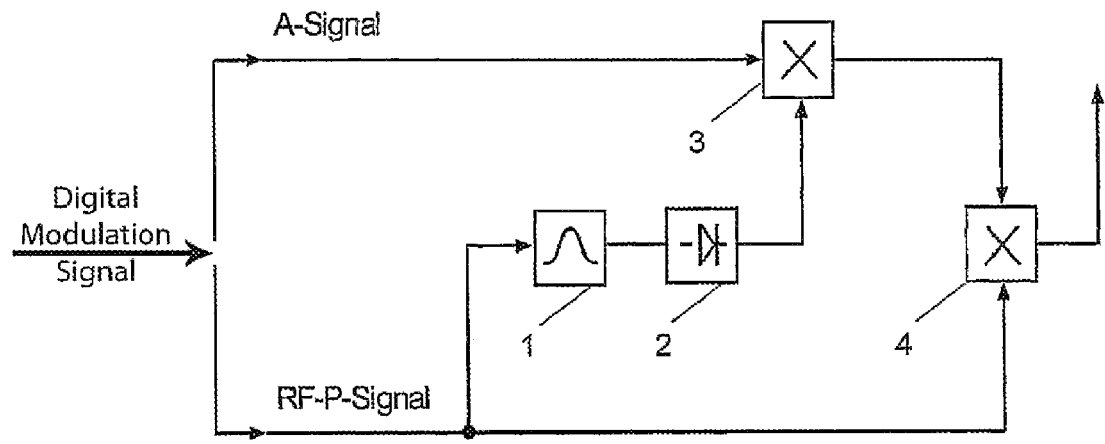
FIG. 1 shows a schematic diagram of a method for reducing out-of-band and spurious emissions of AM transmitters in digital operation.
Figure 2:
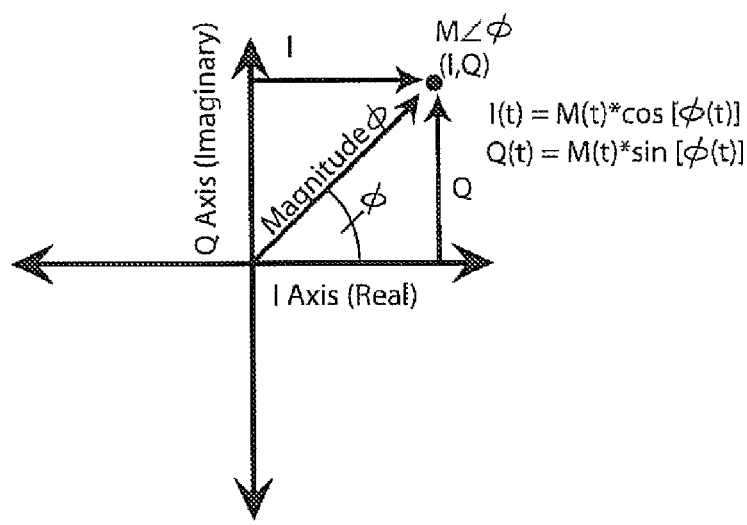
FIG. 2 shows the I/Q signal components of a modulated digital signal.

Referring to FIG. 1, in an embodiment of the present invention the RF-P signal, i.e., phase-modulated carrier signal, is tapped off from the RF branch and passed through a filter 1 having a Gaussian-shaped amplitude response and linear phase. At the output of the filter 1 the modified REP signal has an amplitude response corresponding to the Gaussian transfer function. These amplitude variations are detected using an envelope comparator 2 so that the envelope signal is available as a correction signal by which the A signal, i.e., amplitude signal, is multiplied in a multiplier 3 additionally implemented in the A branch. The corrected A signal resulting from the multiplication reaches the linear input of the transmitter output stage while the RF-P signal is present in its original form at the switched input of the transmitter output stage 4. The multiplication of these two signals produces the digital broadcast signal which, because of the correction method, causes relatively few out-of band and spurious emissions.

The described method leads to the desired result because, first of all, the multiplier of the transmitter output stage allows linear operation for the A-input without reduction in efficiency and, secondly, the associative law applies to a product, the associative law being used here as follows:

$$r*a=(l*k)*a=l*(k*a)$$

r—filtered RF-P signal (with amplitude variations)
a—amplitude signal
l—unfiltered RF-P signal (constant amplitude)
k—amplitude variations of the filtered RF-P signal=correction signal

What is claimed is:

1. A method for reducing out-of-band and spurious emissions of an amplitude modulation (AM) transmitter in digital operation, comprising:

providing, from a digital modulation signal, an amplitude signal in an amplitude (A) branch;

providing, from the digital modulation signal, a phase-modulated carrier (RF-P) signal in a radio frequency (RF) branch;

tapping the RF-P signal in the RF branch so as to provided a tapped RF-P signal;

passing the tapped RF-P signal through a Gaussian filter in a separate branch so as to provide a filtered RF-P signal, the Gaussian filter having a linear phase;

feeding the filtered RF-P signal to an envelope detector so as to detect amplitude variations;

combining the detected amplitude variations as a correction signal with the amplitude signal in a multiplier in the A branch so as to provide a corrected amplitude signal;

feeding the corrected amplitude signal to a linear input of an output stage of the transmitter; and multiplying the corrected amplitude signal by the RF-P signal in the output stage.

2. An amplitude modulation (AM) transmitter for digital operation comprising:

an amplitude (A) branch configured to carry an amplitude signal provided from a digital modulation signal;

a radio frequency (RF) branch configured to carry a phase-modulated carrier (RF-P) signal provided from the digital modulation signal;

a tapping branch configured to tap the RF-P signal so as to provided a tapped RF-P signal;

a Gaussian filter connected in a separate branch, the Gaussian filter having a linear phase and being configured to filter the tapped RF-P signal so as to provided a filtered RF-P signal;

an envelope detector configured to receive the filtered RF-P signal so as to detect amplitude variations;

a first multiplier connected in the A branch and configured to combine the detected amplitude variations as a correction signal with the amplitude signal so as to provide a corrected amplitude signal;

an output stage having a linear input configured to receive the corrected amplitude signal; and a second multiplier connected in the output stage and configured to multiply the corrected amplitude signal by the RF-P signal.

* * * * *